(12) United States Patent
Stuhec et al.

(10) Patent No.: US 8,087,030 B2
(45) Date of Patent: Dec. 27, 2011

(54) PROCESSING A RECEIVED MESSAGE

(75) Inventors: Gunther Stuhec, Heidelberg (DE);
Volker Wiechers, Heidelberg (DE);
Karsten K. Bohlmann, Rauenberg (DE)

(73) Assignee: SAP AG, Walldorf ( * ) Notice: Subject to any disclaimer, the term of this patent is extended or adjusted under 35 U.S.C. 154(b) by 1161 days.

(21) Appl. No.: 11/618,449

(22) Filed: Dec. 29, 2006

(65) Prior Publication Data
US 2008/0163244 A1 Jul. 3, 2008

(51) Int. Cl.
*G06F 9/44* (2006.01)
(52) U.S. Cl. ........ 719/313; 719/315; 707/802; 707/803; 707/809; 707/810; 707/811
(58) Field of Classification Search ........................ None
See application file for complete search history.

(56) References Cited

U.S. PATENT DOCUMENTS

| | | | | |
|---|---|---|---|---|
| 2004/0254945 | A1* | 12/2004 | Schmidt et al. | 707/100 |
| 2005/0223060 | A1* | 10/2005 | Lueckhoff | 709/206 |
| 2006/0259912 | A1* | 11/2006 | Weinrich et al. | 719/315 |
| 2006/0265689 | A1* | 11/2006 | Kuznetsov et al. | 717/117 |

OTHER PUBLICATIONS

"How to Solve the Business Standards Dilemma the Context Driven Business Exchange" by Gunther Stuhec (published Oct. 20, 2005) (http://xml.coverpages.org/SAP-BusinessStandardsDilemma-CCTS-1.pdf) (attached as "SAP-BusinessStandardsDilemma-CCTS-1.pdf").*

'Designing Interfaces and Proxy Generation' [online]. SAP, [retrieved on Jan. 31, 2007]. Retrieved from the Internet: <URL: http://help.sap.com/saphelp_nw2004s/helpdata/en/ba/d4c23b95c8466ce10000000a114084/>, 2 pages.
'Message Type' [online]. SAP, [retrieved on Jan. 31, 2007]. Retrieved from the Internet: <URL: http://help.sap.com.saphelp_nw2004s/helpdata/en/2d/c0633c3a892251e10000000a114084>, 2 pages.
Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.
Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.
GoXML Registry [online], Xenos, 2002 [retrieved on Mar. 23, 2005]. Retrieved from the Internet: <URL: http://www.xmlglobal.com/solutions/prod_goxml_registry.asp>.
The Company of the Open Standard Solutions [online], ebXMLsoft Inc., 2001-2004 [retrieved on Mar. 23, 2005]. Retrieved from the Internet: <URL: http://www.ebsmlsoftcom/>.

(Continued)

*Primary Examiner* — S. Sough
*Assistant Examiner* — Shih-Wei Kraft
(74) *Attorney, Agent, or Firm* — Fish & Richardson P.C.

(57) ABSTRACT

Processing a received message includes receiving a message that includes a plurality of values associated with respective data elements that assign an information category to each of the values. The message further includes a plurality of context values belonging to respective context categories. The method includes identifying, in a relevance record and for a first one of the context categories in the message, at least one of the data elements that is relevant for the context value of the first context category. A rule associated with the context value of the first context category is applied to the value of the identified at least one data element. A system includes a message receiving module, a context value module and a processing module.

13 Claims, 6 Drawing Sheets

OTHER PUBLICATIONS

Project: ebXML Registry/Repository: Summary [online], SourceForge.net, 2005 [retrieved on Mar. 23, 2005]. Retrieved from the Internet: <URL: 114)://sourceforge.net/projects/ebsmlrr >.

*Core Components Technical Specification V2.01—Part 8 of the ebXML Framework*, United Nations Centre for Trade Facilitation and Electronic Business, pp. 1-113, Nov. 15, 2003.

* cited by examiner

PROCESSING A RECEIVED MESSAGE

TECHNICAL FIELD

This document relates to message processing.

BACKGROUND

Electronic communication can be streamlined using data elements to identify specific information portions in the electronic message. The elements are to be used as components of the electronic communication in that they are individually associated with the different categories of information included therein. Using a commonly accepted form of such elements, such as a form adopted by standard or agreed upon between business partners, eliminates some problems or inconsistencies that may otherwise occur. For example, the standard UN/CEFACT Core Components Technical Specification (CCTS) defines Core Components as semantic-oriented and context-independent data elements to be used as building blocks in such an endeavor. Similarly, the CCTS defines Business Information Entities as context-specific and semantically unambiguous elements.

When messages are exchanged, they sometimes focus on very specific context-related aspects of a business relationship. In the past, attempts have been made with a proxy-based arrangement that works with rigid static types and interfaces between various systems. This can lead to a relatively tight interoperability between the organizations that wish to exchange semantic business information in form of electronic messages or otherwise. For example, in this approach when a new organization is added (e.g., a business partner), it may be necessary to create a new rigid message interface.

SUMMARY

In a first general aspect, a computer-implemented method for processing a received message includes receiving a message that includes a plurality of values associated with respective data elements that assign an information category to each of the values. The message further includes a plurality of context values belonging to respective context categories. The method includes identifying, in a relevance record and for a first one of the context categories in the message, at least one of the data elements that is relevant for the context value of the first context category. The method includes applying a rule associated with the context value of the first context category to the value of the identified at least one data element.

Implementations can include any, all or none of the following features. The method can further include identifying, after applying the rule and for a second one of the context categories in the message, at least another one of the data elements that is relevant for the context value of the second context category. The method can further include applying another rule associated with the context value of the second context category to the value of the identified at least one other data element, wherein the other rule is not applied to the context value of the first context category. Respective identifications can be performed in sequence for each of the context categories of the context values in the message. The method can further include determining that at least one of the data elements is not included in the relevance record, and performing an exception procedure for the at least one non-included data element. The exception procedure can include sending a response to a sender of the message, the response identifying for the at least one non-included data element. The exception procedure can include performing an action to identify a type for the at least one non-included data element. The method can further include assigning a type to the data element before applying the rule, and the value can be selected for rule application based on the rule also being associated with the type. Type assignments can be performed in sequence for each of the context values, and each of the type assignments can be performed for any of the data elements identified for the corresponding context category. A plurality of data elements can be identified for the first context category, and the rule can be applied to the value of at least one of the plurality of data elements. Multiple rules can be organized in a hierarchy according to context values, and the method can further include navigating to the rule in the hierarchy using the context value of the first context category.

In a second general aspect, a system for processing a received message includes a message receiving module receiving a message. The message includes a plurality of values associated with respective data elements that assign an information category for each the values. The message further includes a plurality of context values belonging to respective context categories. The system includes a context value module identifying, for a first one of the context categories in the message, at least one of the data elements that is relevant for the context value of the first context category. The system includes a processing module applying a rule to the value associated with the identified at least one data element. The rule is associated with the context value of the first context category.

Implementations can include any, all or none of the following features. The processing module can perform respective identifications in sequence for each of the context categories of the context values in the message. The processing module can perform an exception procedure upon determining that at least one of the data elements is not included in the relevance record. The exception procedure can include sending a response to a sender of the message, the response identifying the at least one non-included data element. The exception procedure can include performing an action to identify a type for the at least one non-included data element. The processing module can assign a type to the data element before applying the rule, and the value can be selected for rule application based on the rule also being associated with the type. The processing module can perform type assignments in sequence for each of the context values, and each of the type assignments can be performed for any of the data elements identified for the corresponding context category. The processing module can identify a plurality of data elements for the first context category and apply the rule to the value of at least one of the plurality of data elements. Multiple rules can be organized in a hierarchy according to context values, and the processing module can navigate to the rule in the hierarchy using the context value of the first context category.

Implementations can provide any, all or none of the following advantages. Improved handling of semantic information using a context driven and proxy-less processing. Improved semantic processing with a late data type binding. Message processing can be provided that is based on the context and not on an entire message interface. Improved message handling when unknown data elements are encountered. Dynamic definition of interfaces that does not require complete structures of possible elements. Processing on demand, with type casting according to the instantiated elements. Flexible exchange of business messages between business partners without beforehand manual and mutual agreements.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
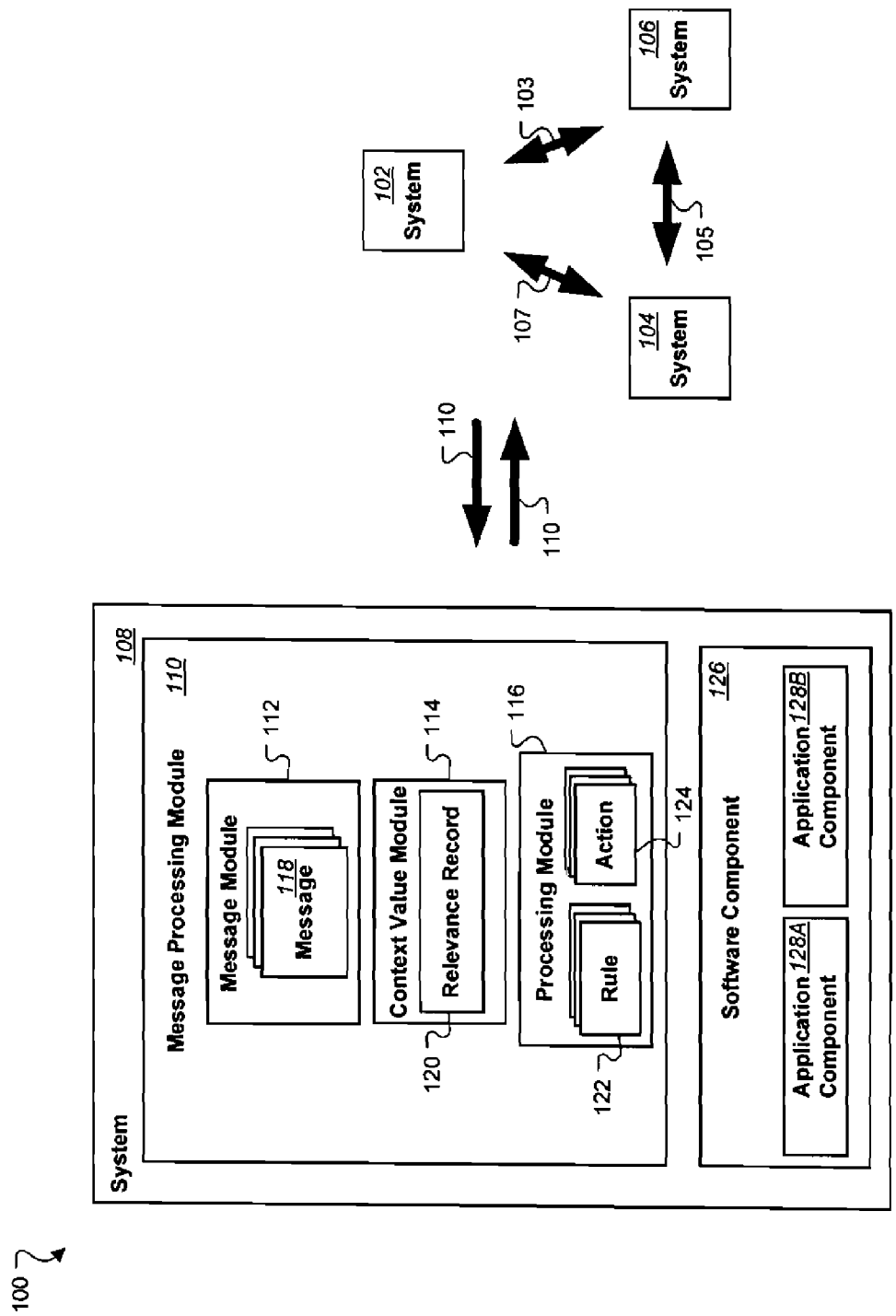
FIG. 1 is a block diagram that illustrates an example system for processing of a received message with a specified context.

FIG. 1 schematically shows an environment 100 for receiving and processing context specific messages, including one or more data elements. The context specific elements can be used in electronic communications between actors, for example actors that use computer systems 102, 104 and 106. The first system 102 may be operated by an automotive manufacturer, the second system 104 by an insurance company, and the third system 106 by a financial institution, to name a few examples. The systems are connected using any conventional computer network, such as the Internet, so that any two of these actors can electronically communicate with each other using business communication protocols.

The transactions between the actors take place in specific contexts depending on which actors are involved. Communication between the automotive and insurance systems may take place in a first context 107. In this example, the first context may be referred to as an "insurance" context because the manufacturer is insured by the insurance company. Communication between the insurance and financial systems may take place in a second context 105. Here, the second context may be referred to as a "financial services" context because the financial institution provides financial services for the insurance company Communication between the automotive and financial systems may take place in a third context 103. Here, the third context may be referred to as a "banking" context because the financial institution handles banking business for the manufacturer. Any or all of the contexts 103-107 can also be specified as to one or more other context values, such as "Country".

Any of the systems 102, 104 or 106 may access specific information and services available in a computer system 108, to be described below, for participating in the electronic communication with any other actor. Such access may take place over the computer network and is schematically illustrated by arrows 110. For example, the system 108 may be part of a translation system that any actor uses to convert received business information from one business communication protocol, or schema, to another. In other embodiments, one or more of the actors' main systems (102-106) may include the some or all components of the system 108.

In some embodiments, the systems 102, 104, 106 do not have proxies that define how to typify the semantic categorization of content in received messages. Rather, these systems can parse the contents and thus assign types to the content. For example, the received messages may be generated by a sender based on a specific context, such as a country or an industry. Using a CCTS-based configuration, for example, the systems 102, 104, 106 can generate messages that include context information (e.g., country, industry, partner, etc.). A receiver can interpret the CCTS-based messages and identify a context of the message from the included context information. After the context information is identified, the receiver can process data elements in the received message by identifying processes that are relevant to a context of the message.

The system 108 can dynamically process a received message. For example, the system 108 can dynamically identify, from the received message, a context of the received message. In some examples, the system 108 can reduce the amount of user interventions necessary for processing the received message. After identifying that the message has been received, in the context 103, for example, the system 108 can process one or more data elements that is relevant for the context 103. For example, the system 108 can apply business logics and perform actions to the received message that are relevant to the context 103. Any system can be configured to process the received message partially or entirely.

The system 108 includes a message processing module 110 to process data included in received messages. For example, the received messages may include several values associated with data elements and context values specifying the context of the messages. The data elements can be used to assign an information category to each of the values. The context values, in turn, can belong to respective context categories, such as those defined in CCTS. The processing module can be configured for use with a set of context categories and their values. The message processing module 110 includes a message module 112, a context value module 114, and a processing module 116.

The message module 112 receives one or more messages 118. For example, the message 118 may include a context value "Canada" associated with a context category "Country," and a context value of "Financial Services" associated with a context category "Industry," to name a few examples. In some embodiments, the message 118 may include a message body and a message header. In some examples, the context values are included in the message header. Using the one or more context values and their associated context categories, the message processing module 110 can trigger the context value module 114 to identify the relevant data element(s) from the received message 118 for processing.

The context value module 114 includes one or more relevance records 120 to identify one or more relevant data elements in the messages 118. The relevance record 120 can be predefined and can include some or all of the context categories and context value definitions. For example, the system 108 may obtain the relevance record by accessing a database via, for example, the Internet. In some embodiments, the system 108 may store a set of context categories and context value definitions. For example, the relevance record 120 may include information indicating that a context value "CA" in the context category "Country" represents "Canada." When the relevance record 120 does not include a definition for a specific context value or context category in the messages 118, the system 108 may access the computer network to obtain the type or other definition of an unknown value (e.g., an undefined context value or an undefined context category).

The message processing module 110 can identify a data element as being relevant to the identified context using the relevance record 120. For example, the relevance record 120 may include a mapping between context values and data elements. Based on the value received for any context category, the message processing module 110 can trigger the context value module 114 to identify one or more data elements relevant to that context category. Some examples of identifying relevant data elements in the received message 118 are described with reference to FIGS. 2-3.

The message processing module 110 can then process the relevant data element(s) in the messages 118 using the processing module 116. Based on the identified context, the processing module 116 can apply rules associated with the context value of the identified context category. In this example, the processing module 116 includes rules 122 and actions 124. The processing module 116 can apply the rules 122 (e.g., business logic) to the data element values and subsequently perform one or more of the actions 124 (e.g., business action) associated with particular outcomes of the rules.

In some examples, the message processing module 110 may execute a type casting or type binding operation to set a data type for each of the relevant data elements before applying the rules 122 to the values of the data elements. For example, the relevant data element may relate to a payment amount, and the processing module 116 may first type cast the payment amount data element into a numerical data type before applying the rules 122 and the actions 124. For example, the processing module 116 may include a rule to check whether the payment amount is sufficient, which requires the payment amount data element to be type cast into the numerical data type for numerical comparison. An example of applying the rules 122 and the actions 124 to the received message 118 based on the identified context is described with reference to FIG. 4.

The system 108 also includes at least one software component 126 that can perform business operations using the received messages 118. For example, the software component 126 may be a customer relationship management (CRM) system, a marketing system, or an accounting system, to name a few examples. The software component 126 can include one, two, or several application components 128A, 128B. In some embodiments, the application components 128A, 128B may be context-specific subsets of the software component 126. For example, the application component 128A may be part of a CRM system being used for Canadian customers and the component 128B may be part of a CRM system being used for American customers. In some embodiments, the application components 128A, 128B may be the ultimate recipients of the messages 118. For example, the message 118 may include a context value "CA" and is used by the application component 128A. In some embodiments, the application components 128A, 128B can apply the rules 122 to the messages 118 or provide the rules to be applied. For example, the system 100 can select context-specific rules (e.g., business logic) from the application components 128A, 128B based on a context of the received message is identified. In some embodiments, any of the application components 128A, 128B can correspond to one or more context values.

Figure 2:
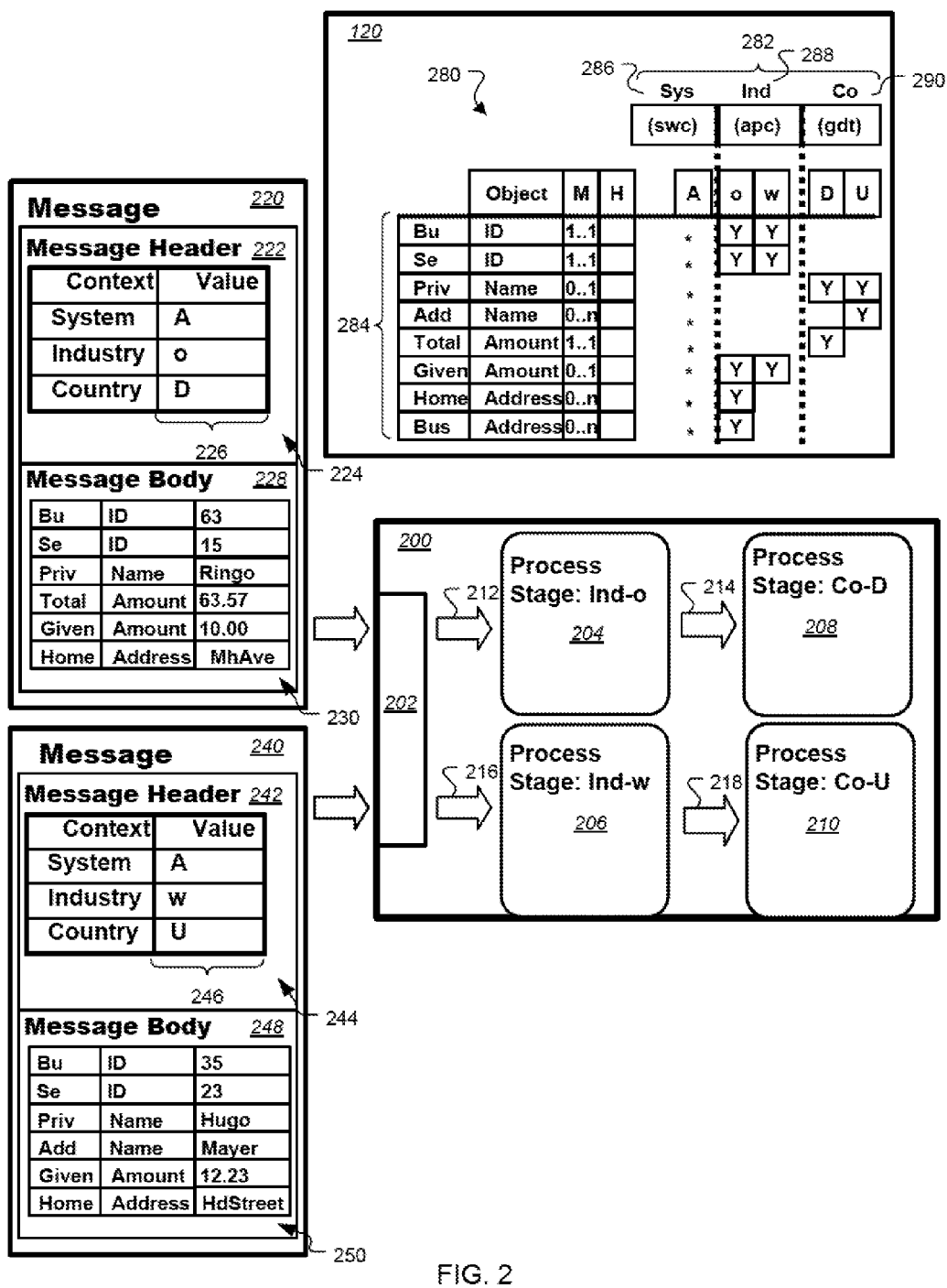
FIG. 2 is a schematic diagram that illustrates examples of processing a message based on context values of the message.
Figure 3:
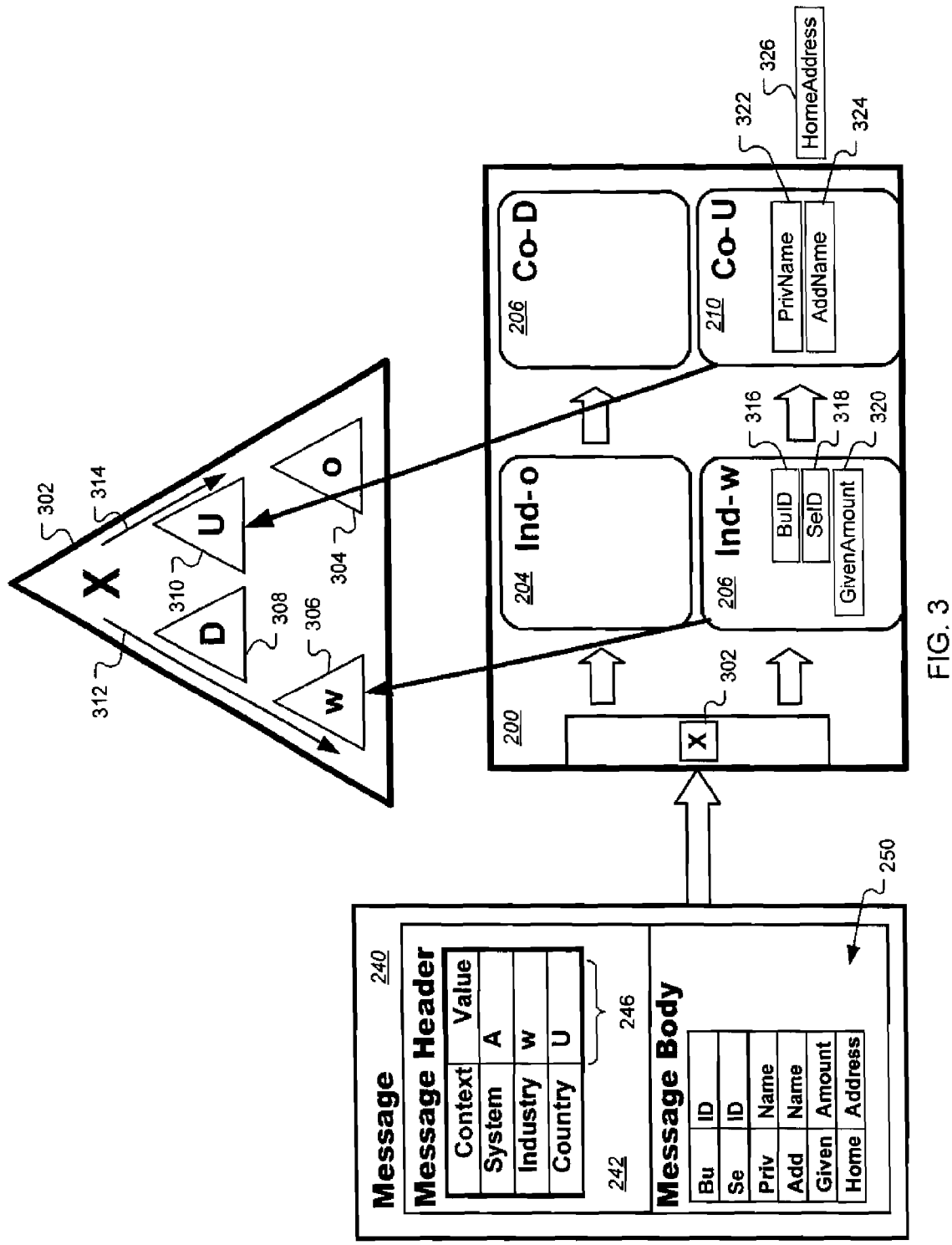
FIG. 3 is a schematic diagram that illustrates an example sequence for processing a received message.

FIGS. 2-3 show some example processes for processing any of the received messages 118. As shown in FIG. 2, a system 200 receives messages 220, 240 during, for example, a business transaction. For example, either of the messages may be a purchase order for purchasing a certain amount of pencils. Using the message processing module 110, the system 200 can dynamically process the messages 220, 240 by identifying contexts of the received messages and applying rules according to the identified contexts.

The system 200 includes an interface 202 and several process stages 204, 206, 208, 210. The system 200 receives the messages 220, 240 via the interface 202 and processes the messages using one or more of the process stages 204, 206, 208, 210. In some embodiments, the system 200 can identify context values in the received messages 220, 240 in a predefined sequence. For example, the system 200 may first identify context values of the "Industry" context category and second identify context values of the "Country" context category. The context category "system" categorizes the software components that are to consider one or more context categories and values in which the interfaces and types are defined. Here, the context value "system A" has initially been processed and has resulted in the context relevance record 120 for the System A being identified.

In the depicted example, the interface 202 can begin the processing of the received messages 220, 240 by identifying a context value of the "Industry" context category. Based on the identified first context category, the interface 202 can invoke the appropriate process stage 204, 206, 208, or 210 to process the received messages 220, 240.

Each of the process stages 204, 206, 208, 210 processes contents of messages depending on the context values included in the messages. The process stage 204 can be used with the message 220, which has a context value "o" in the "Industry" category. Similarly, the process stage 206 processes the message 240, which has a context value "w" in the "Industry" category. The process stage 208 can process the message 220, which has a context value "D" in the "Country" category. The process stage 210 can process the message 240, which has a context value "U" in the "Country" category. In this example, four process stages are shown for simplicity. In other examples, another number of process stages may be included. For example, the system 200 may include a process stage for each of the defined context value in the relevance record 120.

Each of the process stages 204, 206, 208, 210 can apply rules to one or more of the values of the data elements in the received messages 220, 240 that are relevant to the corresponding context of the process stage 204, 206, 208, or 210. In this example, the system 200 can use the relevance record 120 to identify the relevant data elements for the context values. The relevance record 120 includes a relevance information table 280. The relevance information table 280 includes columns 282 and rows 284. Each of the rows 284 represents a data element that may or may not be included in any specific message. Each of the columns 282 represents a context value of a context category. In this example, three context categories 286, 288, 290 are included in the relevance information table 280. In other examples, other context categories may also be defined and/or included in the relevance record 120.

The relevance information table 280 can indicate whether a data element is relevant for a specific context value. In this example, a data element relevant to a specific context value is marked with a box Y. For example, a data element BuID (Buyer Identifier) is relevant to context values "o" and "w" in the "Industry" category.

The messages 220, 240 contain the context values in message headers 222, 242, respectively. As shown, the message headers 222, 242 include context value tables 224, 244, respectively. The context value tables 224, 244 contain specific context values for each of the context categories in this example. In other examples, the context value tables 224, 244 may only include context values for some of the context categories in the relevance record 120. As shown in FIG. 2, the context value table 224 includes context values 226 for the message 220, and the context value table 244 includes context values 246 for the message 240.

The messages 220, 240 also include message bodies 228, 248, respectively. The message bodies 228, 248 here include data elements 230, 250, respectively. In some examples, each of the data elements 230, 250 may carry business information in different information categories. In this example, the message 220 includes the data elements 230: a BuID 63, a SeID 15, a PrivName "Ringo", a TotalAmount 63.57, a GivenAmount 10.00, and a home address "MhAve". The message 240 includes the data elements 250: a BuID 35, a SeID 23, a PrivName "Hugo", an AddName "Mayer", a GivenAmount 12.23, and a home address "HdStreet". Upon receiving the messages 220, 240, the system 200 can process the data elements 230, 250 by first identifying and processing the relevant data elements for the context value of the first context category. Next, the system 200 can sequentially identify and process the relevant data elements for the second context category, and so on. Examples of the processing of the messages 220, 240 by the system 200 are illustrated below.

When the system 200 receives the message 220, the system 200 identifies a first process stage based on the context value of the first context category, which is the "Industry" category in this example. In some embodiments, the interface 202 can identify that a context value of the context category "Industry" of the message 220 is "o". Then, the interface 202 invokes the process stage 204 to the message body following an arrow 212. For example, the system 200 can identify the data elements 230 that are relevant to the context value "o" in the relevance information table 280. Because the BuID, the SeID, the TotalAmount, and the GivenAmount of the message 220 are indicated as relevant in the table 280, the process stage 204 applies rules to process these data elements. The outcome of the rule can be to perform one or more actions in the system. Thus, this can be considered a "consumption" of the value(s) for these data elements, and the value(s) may be omitted in subsequent stages.

After the process stage 204, the system 200 identifies a context value for the next context category, which is the "Country" category in this example. From the message header 222, the system 200 can identify that the context value of the "Country" category is "D". The system 200 then invokes the process stage 208 to process the unprocessed data elements, following an arrow 214. As indicated in the relevance information table 280, the data elements that are relevant to the context value "D" of the "Country" category are the PrivName and the HomeAddress. The process stage 208 can then apply rules to the PrivName and the HomeAddress data elements and can perform some action(s) as a result. Because all the data elements 230 included in the message 220 are processed at this point, the system 200 can determine that it has successfully process the message 220.

Similarly, the system 200 can process the message 240 by sequentially identifying and processing relevant data elements. The system 200 may first identify the context value "w" of the "Industry" category of the message 240. Then, the system can invoke the process stage 206, following an arrow 216, to process the data elements 250 that are relevant to the context value "w" of the "Industry" category using the relevance information table 280. Sequentially, the system 200 identifies, from the message 240, the context value "U" of the "Country" category. Then, the system can invoke the process stage 210, following an arrow 218, to process the data elements 250 that are relevant to the context value "U" of the "Country" category using the relevance information table 280. In some examples, the system 200 may use a message model (e.g., an ABAP message model) to determine which context information is to be used to process the data elements.

FIG. 3 shows an example process of using a message interface 302 to process the message 240. In this example, the message interface is not a complex structure. Rather, it considers only the structure of the first hierarchy of a message, such as the subjacent elements of a purchase order. All elements will have also assigned to them context categories and values with which these elements should be processed. The system will refer the elements to the correct processing steps according to this information.

Using the message interface 302, the system 200 can process received messages dynamically using a CCTS-based interface. Here, the interface 302 includes information for specified context values of different context categories. The model includes a message model 304 for the context value "o", a message model 306 for the context value "w", a message model 308 for the context value "D", and a message model 310 for the context value "U". Here, the message interface 302 is referred to as an "ABAP" interface because it is created for system components generated using the ABAP programming language introduced by SAP AG.

In this example, the system 200 can invoke the ABAP message interface 302 to navigate to a message model that corresponds to an identified context in the message 240. Here, the system 200 uses the interface 302 to navigate to the message model 306, as shown by an arrow 312. The system 200 can then use the message model 306 to process the relevant data elements in the message 240 for the process stage 206. For example, the system 200 can retrieve information, such as type binding information, required to execute the process stage 206 from the message model 306. An example of usage of the message model 306 is described with reference to FIG. 4.

As another example, when the system 200 identify the context value "U" of the "Country" category, the system 200 can use the interface 302 to navigate to the message model 310, as shown as an arrow 314. The system can then use the message model 310 to process the relevant data elements in the message 240 for the process stage 210. For example, the system 200 can retrieve information, such as type binding information, required to execute the process stage 210 from the message model 310.

As shown in FIG. 3, the process stages 204, 206, 208, 210 also include the data types of its data elements 250 that are relevant to the corresponding process stages 204, 206, 208, 210 based on the context values 246. Here, the process stage 206 includes a BuID 316, a SeID 318, and a GivenAmount 320, and the process stage 210 includes a PrivName 322 and an AddName 324.

In some embodiments, the system 200 can determine whether one or more data elements are not included in the relevance record 120. Here, the system 200 can identify that a HomeAddress 326 is not included in the relevance record 120 because the HomeAddress 326 is neither processed by the process stage 206 nor the process stage 210. To complete processing of the message 240, the system 200 can perform an exception procedure for the HomeAddress 326. For example, upon determining that the HomeAddress 326 is not included in the relevance record 120, the system 200 can generate an exception to handle the non-included data element.

In some embodiments, the systems 200 may handle the exception by sending a response to a sender of the message 240, by identifying a type for each of the non-included data elements, or both. For example, the system 200 can send a response to a sender of the message 240 to, for example, request a message model for the context value HomeAddress. In another example, the system 200 can access a database, such as a common repository, to retrieve information of a message model to process the HomeAddress 326. In another example, the system 200 can first access the database to retrieve information to process the HomeAddress. If the information is not found in the database, then the system 200 can send the response to the sender of the message 240 to request more information to process the HomeAddress 326. In another example, the exception procedure can comprise acquiring a web service for further processing the remaining data elements.

Figure 4:
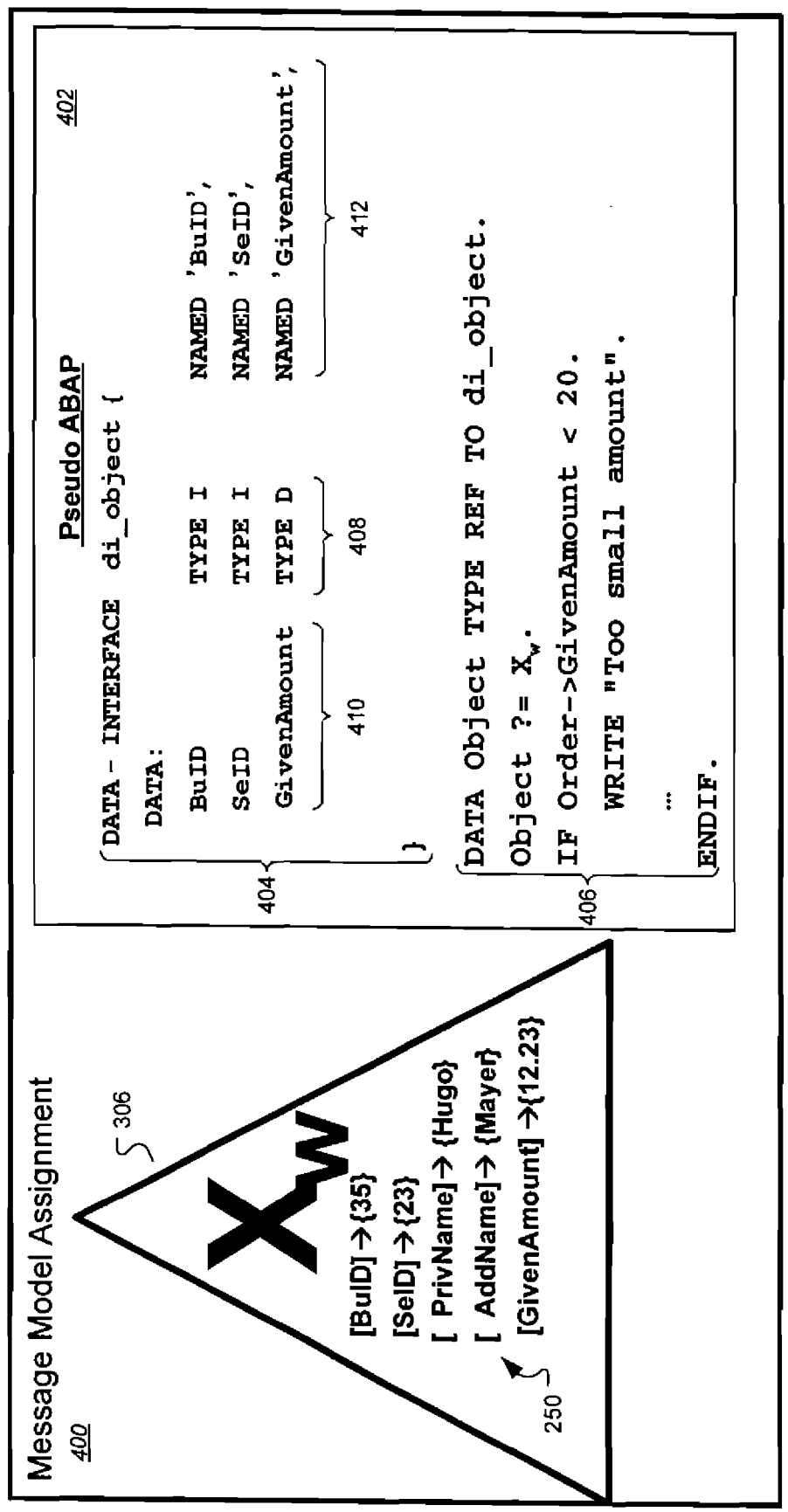
FIG. 4 is a block diagram that illustrates an example of a message model assignment.

FIG. 4 shows an example of a message model assignment 400 that can be generated by the system 200. The system 200 can generate the message model assignment 400 using the interface 302 to navigate to a specified context and to assign data types to the relevant data elements.

Here, the system 200 navigates to the message model 306 to process the data elements 250 in the process stage 206. Using the information in the message model 306, the system 200 can generate an object 402—here exemplified using pseudo code and therefore referred to as a "Pseudo ABAP" object—to process the relevant data elements in the process stage 206. The object 402 includes a type binding portion 404 and an operation portion 406.

In the type binding portion 404, the system 200 assigns a type 408 for each relevant data element 410. In the depicted example, names 412 are also given to each of the relevant data elements 410 for further processing. After the types 408 are assigned to each of the relevant data element 410, the system 200 applies rules and actions to at least one of the relevant data elements in the operation portion 406. The system identifies the type that the data element is to be cast to through the process steps concerning the defined types that are used for a specific set of contexts. In some embodiments, the type assignments are performed in sequence for each of the identified context values. For example, the system 200 may first assign types for the data elements that are relevant for an identified context value of the first context category. Next, the system 200 may assign types for the data elements that are relevant for an identified context value of the second context category, and so on.

According to the identified context values, applicable rules may be organized in a hierarchy. For example, the system 200 can use the processing module 116 to perform the operation portion 406 based on the identified context values of the corresponding context category. This can include a selection of one or more of the rules 122 and the actions 124 that correspond to the portion 406. Here, the system 200 selects to perform a statement to compare whether a GivenAmount (which is assigned a decimal data type) is smaller than 20. If the system 200 determines that the GivenAmount is smaller than 20, then the system 200 performs an action, which is executing a write command with a string "Too small amount". Other rules and actions may also be included in the operation portion 406.

Figure 5:
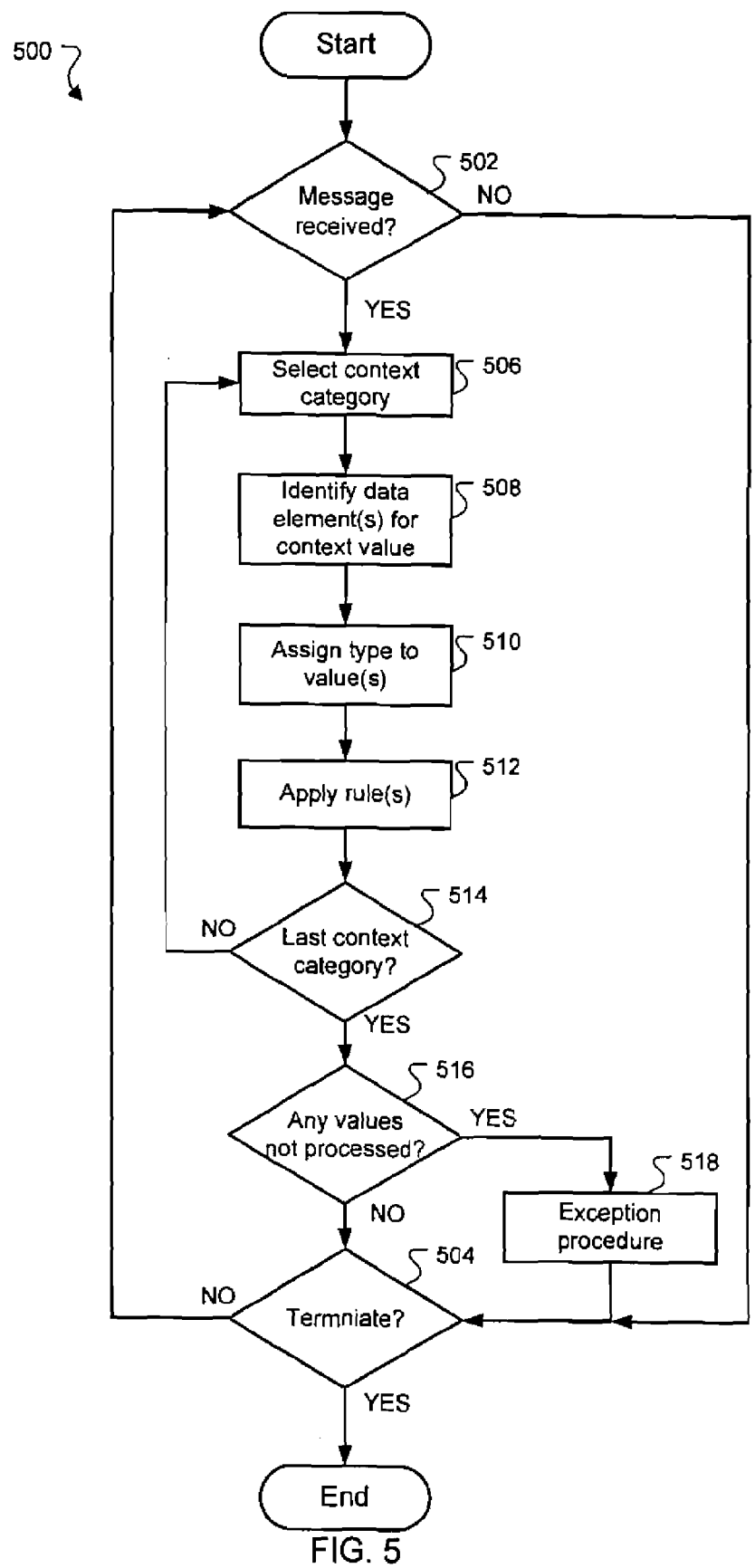
FIG. 5 is a flow diagram that illustrates a method for processing a received message.

FIG. 5 is a flow chart of exemplary operations 500 that can be performed for processing a received message. The operations 500 can be performed by a processor executing instructions stored in a computer program product. The operations 500 begin in step 502 with determining whether a message is received. For example, the system 200 may determine whether a message 240 is received. If it is determined that a message is not received, then it is determined whether the operations 500 are terminated in step 504. If it is determined that the operations 500 are terminated, then the operations 500 end. If it is determined that the operations 500 are not terminated, then the step 502 is repeated.

In step 502, if it is determined that a message is received, then the operations 500 comprise, in step 506, selecting a context category. All elements can be submitted to the appropriated process step that concerns the assigned types in the given context. For example, the message processing module 110 may select a context category to begin with, such as the "Industry" category. Next, the operations 500 comprise identifying relevant data elements for a first context value in step 508. For example, the message processing module 110 can identify relevant data elements in the received message using the relevance record 120. In step 510, the operations 500 comprise assigning a type to one or more values. For example, the system 200 can assign types to the relevant data elements as shown in the message model assignment 400.

After assigning types to values, the operations 500 comprise, in step 512, applying one or more rules. For example, the rules 122 can be applied to the relevant data elements as shown in the operation portion 406. The operation portion 406 can process the relevant data elements. Next, the operations 500 comprise determining whether the currently selected context category is the last context category in step 514. If there are more context categories, then, the step 506 is performed. If, in contrast, the currently selected context category is the last context category, then, in step 516, the operations 500 comprise determining whether there are any values that were not processed. For example, the system 200 may determine that all data elements are processed as described with reference to FIG. 2. In another example, the system 200 may determine that, as described with reference to FIG. 3, the HomeAddress data element of the message 240 is not processed.

If it is determined that there is no other value to be processed, then the step 504 is performed. In contrast, if it is determined that there is at least one other value that was not processed, then, in step 518, the operations 500 comprise executing an exception procedure. For example, the system 200 may generate an exception when at least one non-included data element is identified. For example, the system 200 may handle the exception by sending a response to a sender of the message 240, by accessing a remote resource to identify a type for each of the non-included data elements, or both. After the exception procedure is executed, the operations 500 comprise executing the step 504.

Figure 6:
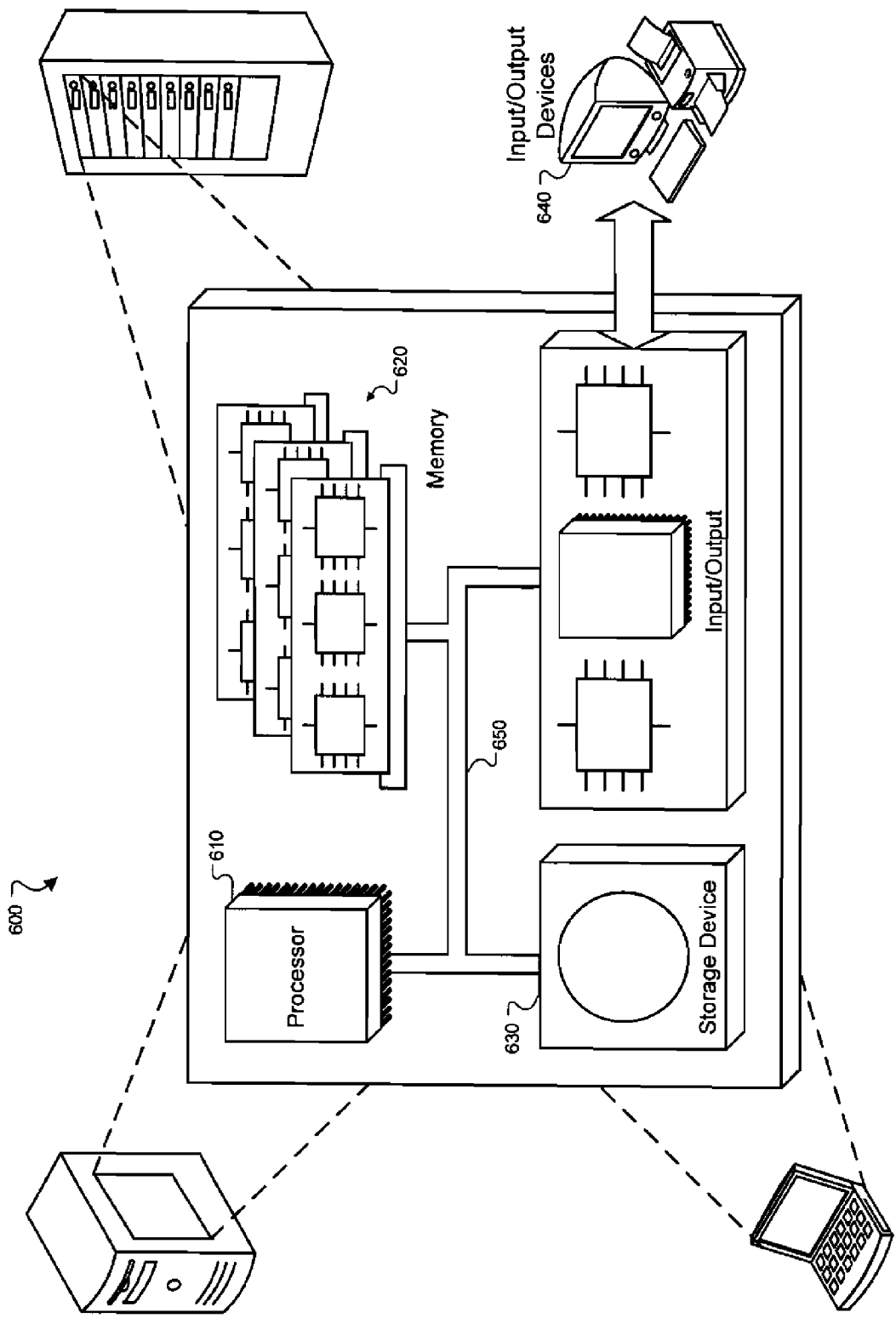
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for processing a received message, the method comprising:

receiving, by at least one programmable computer processor, a message that includes a plurality of values that are each associated with a respective data element that assigns an information category to the respective value, the message further including a plurality of context values belonging to respective context categories;

applying, to at least some of the plurality of values, rules that are selected as being specific to each of the plurality of context values, the rules applied by:

identifying, by the programmable computer processor and within the message, a first context value for a first context category from the plurality of context values;

identifying, by the programmable computer processor and using a relevance record, those first data elements of the data elements in the message that are relevant for the first context value of the first context category;

selecting, by the programmable computer processor, one or more first rules that are specific to the first context value;

applying, by the programmable computer processor, the one or more first rules to the values of the first data elements;

performing, by the programmable computer processor, first actions that correspond to outcomes of the one or more first rules;

identifying, by the programmable computer processor and within the message, a second context value for a second context category from the plurality of context values;

identifying, by the programmable computer processor and using the relevance record, those second data elements of the data elements in the message that are relevant for the second context value and omitting, from the second data elements, one or more first data elements that are relevant for the second context value;

selecting, by the programmable computer processor, one or more second rules that are specific to the second context value;

applying, by the programmable computer processor, the one or more second rules to the values of the second data elements, wherein the one or more second rules are not applied to any value associated with any of the first data elements; and performing, by the programmable computer processor, second actions that correspond to outcomes of the one or more second rules;

determining, after the rules that are selected as being specific to each of the plurality of context values are applied, whether the message includes one or more unprocessed data elements for which none of the rules were applied; and performing, in response to determining that the message includes the one or more unprocessed data elements, an exception procedure to handle the one or more unprocessed data elements.

2. The method of claim 1, wherein the exception procedure comprises sending a response to a sender of the message, the response identifying the one or more unprocessed data elements.

3. The method of claim 1, wherein the exception procedure comprises performing an action to identify a rule for the one or more unprocessed data elements.

4. The method of claim 1, further comprising assigning a type to the first data elements before applying the one or more first rules, wherein the type is selected based on the one or more first rules also being associated with the type.

5. The method of claim 4, wherein type assignments are performed in sequence for each of the plurality of context values, each of the type assignments being performed for any data elements identified for the corresponding context category.

6. The method of claim 1, wherein multiple rules are organized in a hierarchy according to context values, further comprising navigating to the first rule in the hierarchy using the first context value of the first context category.

7. A computer program product tangibly embodied in a machine-readable storage device and comprising instructions that when executed by a processor perform a method for processing a received message, the method comprising:

receiving, at a server system, a message that includes a plurality of values that are each associated with a respective data element that assigns an information category to the respective value, the message further including a plurality of context values belonging to respective context categories;

applying, to at least some of the plurality of values, rules that are selected as being specific to each of the plurality of context values by, the rules applied by:

identifying, by the server system and within the message, a first context value for a first context category from the plurality of context values;

identifying, by the server system and using a relevance record, those first data elements of the data elements in the message that are relevant for the first context value of the first context category;

selecting, by the server system, one or more first rules that are specific to the first context value;

applying the one or more first rules to the values of the first data elements;

performing first actions that correspond to outcomes of the one or more first rules;

identifying, by the server system and within the message, a second context value for a second context category from the plurality of context values;

identifying, by the server system and using the relevance record, those second data elements of the data elements in the message that are relevant for the second context value of the second context category and omitting, from the second data elements, one or more first data elements that are relevant for the second context value;

selecting, by the server system, one or more second rules that are specific to the second context value;

applying, by the server system, the one or more second rules to the values of the second data elements, wherein the one or more second rules are not applied to any value associated with any of the first data elements; and performing, by the server system, second actions that correspond to outcomes of the second rules;

determining, after the rules that are selected as being specific to each of the plurality of context values are applied, whether the message includes one or more unprocessed data elements for which none of the rules were applied; and performing, in response to determining that the message includes the one or more unprocessed data elements, an exception procedure to handle the one Or more unprocessed data elements.

8. A system for processing a received message, the system comprising:

at least one programmable computer processor; and a machine-readable storage device comprising instructions, that when executed by the programmable computer processor, generate:

a message receiving module, at a server system, configured for receiving a message that includes a plurality of values that are each associated with a respective data element that assigns an information category for the respective value, the message further including a plurality of context values belonging to respective context categories;

a context value module, at the server system, configured for (i) identifying within the message, a first context value for a first context category from the plurality of context values and a second context value for a second context category from the plurality of context values, and (ii) identifying using a relevance record, those first data elements of the data elements in the message that are relevant for the first context value of the first context category and those second data elements of the data elements in the message that are relevant for the second context value of the second context category and omitting, from the second data elements, one or more first data elements that are relevant for the second context value; and a processing module, at the server system, configured for (i) selecting one or more first rules that are specific to the first context value and one or more second rules that are specific to the second context value, (ii) applying the one or more first rules to the values of the first data elements and the one or more second rules to the values of the second data elements, wherein the one or more second rules are not applied to any value associated with any of the first data elements, and (iii) performing first actions that correspond to outcomes of the one or more first rules and second actions that correspond to outcomes of the one or more second rules, wherein the processing module performs, in response to determining that the message includes one or more unprocessed data elements for which none of the rules were applied, an exception procedure to handle the one or more unprocessed data elements.

9. The system of claim 8, wherein the exception procedure comprises sending a response to a sender of the message, the response identifying the one or more unprocessed data elements.

10. The system of claim 8, wherein the exception procedure comprises performing an action to identify a rule for the one or more unprocessed data elements.

11. The system of claim 8, wherein the processing module assigns a type to the first data elements before applying the one or more first rules, wherein the type is selected based on the one or more first rules also being associated with the type.

12. The system of claim 8, wherein the processing module performs type assignments in sequence for each of the plurality of context values, each of the type assignments being performed for any data elements identified for the corresponding context category.

13. The system of claim 8, wherein multiple rules are organized in a hierarchy according to context values, and wherein the processing module navigates to the first rule in the hierarchy using the first context value of the first context category.

* * * * *